Figure 1:
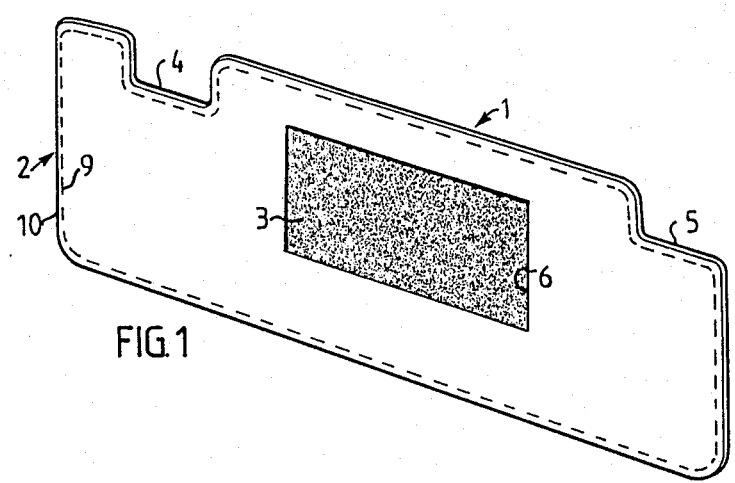

United States Patent [19]

Svensson

[11] Patent Number: 4,822,095

[45] Date of Patent: Apr. 18, 1989

[54] VEHICLE VISOR AND A METHOD FOR ITS MANUFACTURE

[75] Inventor: E. Gunnar Svensson, Malung, Sweden

[73] Assignee: Autopart Sweden AB, Malung, Sweden

[21] Appl. No.: 180,826

[22] Filed: Apr. 12, 1988

[30] Foreign Application Priority Data

Apr. 27, 1987 [SE] Sweden ................................. 8701723

[51] Int. Cl.[4] ................................................ B60J 3/00
[52] U.S. Cl. ................................. 296/97.1; 112/263.1; 112/262.1; 2/DIG. 2
[58] Field of Search .................. 296/97.1, 97.5; 5/490, 5/482; 112/263.1, 262.1; 2/DIG. 2

[56] References Cited

U.S. PATENT DOCUMENTS

| 2,901,038 | 8/1959 | Herr et al. | 296/97.1 |
| 3,371,957 | 3/1968 | Cook | 297/219 |
| 4,458,938 | 7/1984 | Vierlel | 296/97.1 |
| 4,494,789 | 1/1985 | Flowerday | 296/97.1 |
| 4,763,946 | 8/1988 | Robbins et al. | 296/97.1 |

Primary Examiner—Robert R. Song
Attorney, Agent, or Firm—Young & Thompson

[57] ABSTRACT

A motor-vehicle visor comprising an elongated core (7) which is enclosed in a cover which comprises a stretchable textile material. The cover comprises two panels (1,2) which are sewn together along their respective edges (10) with the inner surfaces of the panels facing outwards. The cover is turned right side out and the elongated core is then inserted into the cover through an opening (6) provided therein.

3 Claims, 2 Drawing Sheets

U.S. Patent  Apr. 18, 1989  Sheet 1 of 2  4,822,095

VEHICLE VISOR AND A METHOD FOR ITS MANUFACTURE

The present invention relates to a vehicle visor comprising an elongated core and a cover which embraces the core and which is made of a non-weldable material, preferably a textile material, and which consists of two panels which are sewn together along the edges of the elongated core.

Visors intended for automobiles normally comprise a foamed plastic body or core which is embraced by a plastic cover. In the manufacture of such visors, the plastic core is placed between two foil sheets, which are then welded together around the edges of the plastic core. When desiring, for example, to match the visors with the cloth of the vehicle headliner, the visor cover is made of a textile material, although such materials cannot be welded. Hitherto, these covers have either been placed on mutually opposite sides of the plastic core and sewn together along the edges thereof, in which case all seams are visible on the outside of the visor, or the cover is sewn together along three sides with the cover turned inside out. Subsequent to turning the cover the right way in and inserting the elongated core through openings on the fourth side of the cover, this fourth cover side has been sewn-up with the seams involved located on the outside of said cover. Subsequent to sewing the cover, the edge portions thereof located externally of the outwardly facing seams have been cut or trimmed off, so that only 2 mm of material remains outside the seams.

One drawback with this described method is that additional work is required subsequent to sewing together the cover, and that the method results in edges which are liable to fray and cause the seams to become undone.

The object of the present invention is to provide a visor of the kind described in the introduction which fully eliminates the need of subsequently trimming the edges subsequent to inserting the elongated core into the cover while presenting, at the same time, a uniform, aesthetically attractive edge around the whole of the visor.

This is achieved in accordance with the invention in that the end edges of all of the sewn sides of the cover are located on the inside of the cover; in that at least part of the cover comprises a stretchable material; and in that the cover presents an opening through which the elongated core can be inserted into the cover subsequent to completion of the edge seams.

A visor of this kind can be produced easily, by placing the cover parts together with respective inside surfaces facing outwards and sewing together all edges so as to form a fully closed cover. Subsequent to forming the opening, which may be done before sewing the cover parts together or subsequent thereto, the cover can be turned right side in and the elongated visor core inserted into the cover through said opening, wherewith due to the stretchability of said at least one cover part the size of the opening need not be made so large as to prevent the opening from being obscured from view, behind a mirror, flap or the like.

Figure 2:
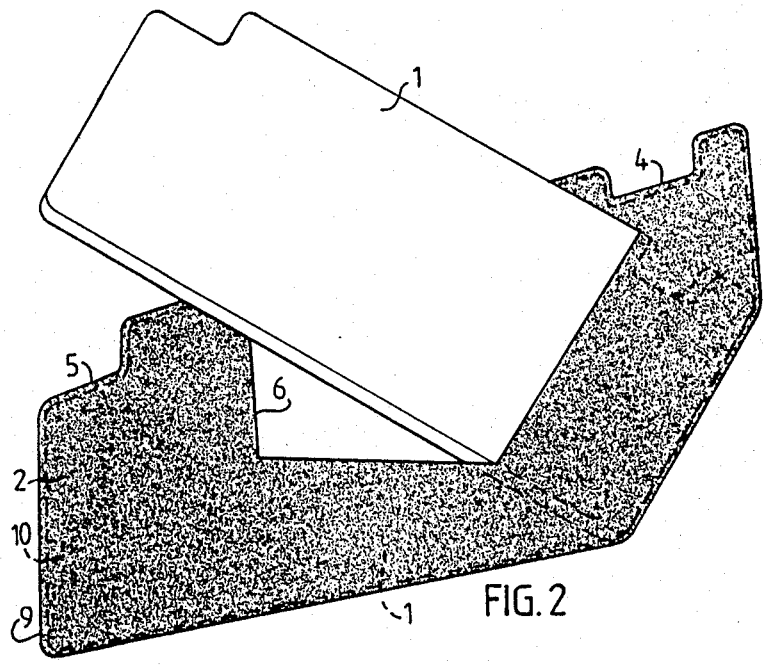
Figure 3:
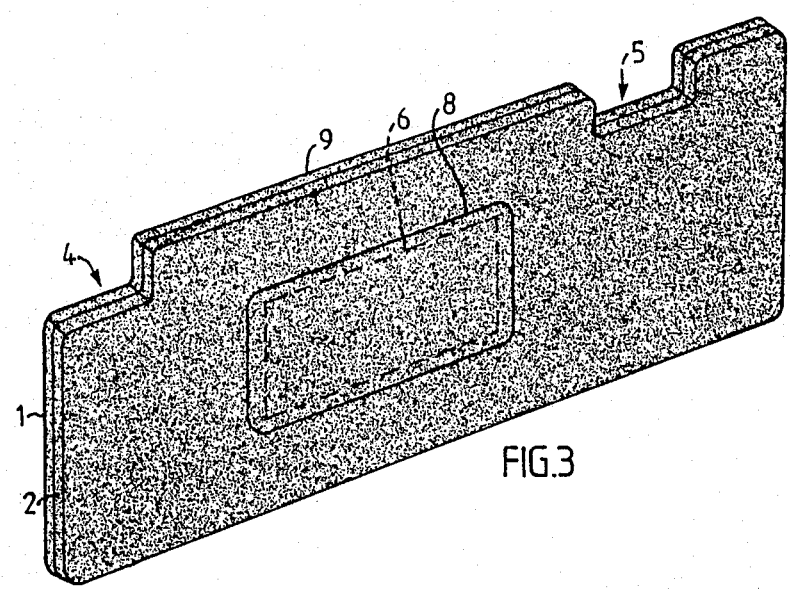

An exemplifying embodiment of the invention will now be illustrated in the accompanying drawing, in which FIG. 1 illustrates a sewn visor cover with the inside of the cover facing outwards, FIG. 2 shows the visor cover with the right side in and the elongated core partially inserted into the cover, and FIG. 3 shows the elongated core fully inserted in the cover.

In FIG. 1 the references 1 and 2 identify two panels which are punched or clipped from a piece of stretchable textile material. The panels 1, 2 are sewn together with their structured outer surfaces 3 facing towards one another, and are provided with a recess 4 for accomodating a main shaft and a recess 5 for accomodating a "counter bearing shaft". One panel, 2, has a rectangular opening 6 formed therein.

FIG. 2 illustrates the panels 1, 2 turned right side in, with the structured surface 3 facing outwardly, and an elongated core 7, made of polyurethane foam for example, partially inserted through the opening 6. FIG. 3 shows the elongated core 7 fully inserted into the cover formed by the panels 1, 2. Because the material from which the cover is made can be stretched, the opening 6 need only be relatively small in order to accomodate the elongated core 7. FIG. 3 shows the finished visor with the opening 6 covered by a piece of material 8 of the same appearance as the material from which the cover is made. This covering material 8 may be glued to the cover, for example. Alternatively the cover can be covered by a pocket or mirror.

The invention enables the seams 9 to be located at a suitable distance from the edges 10 of the panels, so as to exclude the risk of the edges fraying to an extent such as to undo the seams. Because the edges 10 are located inside the cover when the cover is turned right side in, as illustrated particularly in FIG. 2, there is no need to subsequently trim the edges.

I claim:

1. A motor-vehicle visor comprising an elongated core and a cover which embraces the core and which is made of a non-weldable material, preferably a textile material, and which comprises two panels which are sewn together around the edges of the elongated core, characterized in that the end edges (10) of all the sewn sides of the cover are located on the inside of the cover; in that at least one cover panel (1 or 2) is made of a stretchable material; and in that the cover has formed therein an opening (6) through which the elongated core (7) can be inserted into the cover upon completion of the edge seams therearound.

2. A visor according to claim 1, characterized in that a covering element (8), such as a pocket, mirror, flap or like element, is attached to the cover in a manner to obscure the opening from view (6).

3. A method for producing a motor-vehicle visor which includes an elongated core and a cover which embraces the core and which is made of a non-weldable material, preferably a textile material, characterized by placing core panels (1,2) together with their insides facing outwards, at least one of said panels comprising an elastically stretchable material, and sewing the panels along all edges (10) thereof in a manner to form a closed cover; providing an opening (6) in at least one of the cover panels, either before sewing the panel seams or subsequent thereto; turning the cover right side out; and inserting the elongated core 7 into the cover through said opening.

* * * * *